(12) United States Patent
Adduri et al.

(10) Patent No.: US 11,016,855 B2
(45) Date of Patent: May 25, 2021

(54) FILESET STORAGE AND MANAGEMENT

(71) Applicant: Rubrik, Inc., Palo Alto, CA (US)

(72) Inventors: Pranava Adduri, Fremont, CA (US); Claudia Yu, San Francisco, CA (US); Deepak Sethi, Karnataka (IN)

(73) Assignee: Rubrik, Inc., Palo Alto, CA (US)

( * ) Notice: Subject to any disclaimer, the term of this patent is extended or adjusted under 35 U.S.C. 154(b) by 81 days.

(21) Appl. No.: 16/240,678

(22) Filed: Jan. 4, 2019

(65) Prior Publication Data

US 2020/0218614 A1    Jul. 9, 2020

(51) Int. Cl.
  *G06F 16/30*    (2019.01)
  *G06F 11/14*    (2006.01)
  *G06F 16/17*    (2019.01)
  *G06F 16/11*    (2019.01)
  *G06F 16/16*    (2019.01)

(52) U.S. Cl.
  CPC ........ *G06F 11/1448* (2013.01); *G06F 16/128* (2019.01); *G06F 16/164* (2019.01); *G06F 16/168* (2019.01); *G06F 16/1734* (2019.01)

(58) Field of Classification Search
  CPC .... G06F 16/164; G06F 16/168; G06F 16/128; G06F 16/1734
  USPC ........ 707/609, 687, 705, 769, 790, 813, 821
  See application file for complete search history.

(56) References Cited

U.S. PATENT DOCUMENTS

| | | | |
|---|---|---|---|
| 10,121,169 B2* | 11/2018 | Liu | G06Q 30/0275 |
| 2010/0312754 A1* | 12/2010 | Bear | G06F 16/134 |
| | | | 707/685 |
| 2017/0075965 A1* | 3/2017 | Liu | G06F 16/27 |

* cited by examiner

*Primary Examiner* — Sana A Al-Hashemi
(74) *Attorney, Agent, or Firm* — Schwegman Lundberg & Woessner, P.A.

(57) ABSTRACT

A system that manages backups of filesystems. The system analyzes and presents changes in a file system. The system generates user interfaces that present changes to files in the filesystem. The user interfaces allow users to traverse the filesystem to view changes in the filesystem. The changes include file operations that took place during a time interval. As such, users can ascertain a filesystem behavior such as which files were added, modified, or deleted during a time period; how many files under a folder were added, modified, or deleted; or which user has issued most operations in a time interval.

20 Claims, 7 Drawing Sheets

Snapshot Table 226

| ss_id | ss_time | im_list |
|---|---|---|
| m001/fs001.ss1 | 20181001.0300 | m001.im1 |
| m001/fs001.ss2 | 20181001.0900 | m001.im1, m001.im1-2 |
| m001/fs001.ss3 | 20181001.1500 | m001.im1, m001.im1-2, m001.im2-3 |
| m001/fs001.ss4 | 20181001.2100 | m001.im1, m001.im1-2, m001.im2-3, m001.im3-4 |
| m001/fs001.ss5 | 20181002.0300 | . . . |
| . . . | | |

FIG. 3A

Image Table 228

| im_id | im_location |
|---|---|
| m001/fs001.im1 | . . . |
| m001/fs001.im1-2 | |
| m001/fs001.im2-3 | |
| m001/fs001.im3-4 | |
| . . . | |

FIG. 3B

File Table 230

| ss_id | file_id | file directory | File name | Operation | Timestamp |
|---|---|---|---|---|---|
| m001/ fs001.ss3 | 834960 | C:\\Production\working | Wireframe | Modify | 20181001.1023 |
| m001/ fs001.ss3 | 285909 | C:\\Test\working | Wireframe | Add | 20181001.1114 |
| m001/ fs001.ss3 | 175830 | C:\\Test\working | Notes | Read | 20181001.1146 |
| m001/ fs001.ss3 | 693085 | C:\\Production\working | Review | Add | 20181001.1235 |
| m001/ fs001.ss3 | 235908 | C:\\Production\working | Design | Delete | 20181001.1259 |
| ... | ... | ... | ... | ... | ... |

FILESET STORAGE AND MANAGEMENT

BACKGROUND

1. Technical Field

The present invention generally relates to managing and storing data, and more specially relates to managing filesystems.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically also includes backup and retrieval of the virtual machines, in addition to just the application data.

As the amount of data to be backed up and recovered increases, there is a need for better approaches to visualize changes in file systems.

SUMMARY

Described herein is a system that manages backups of filesystems. The system analyzes and presents changes in a file system. The system generates user interfaces that present changes to files in the filesystem. The user interfaces allow users to traverse the filesystem to view changes in the filesystem. The changes include file operations that took place during a time interval. As such, users can ascertain a filesystem behavior such as which files were added, modified, or deleted during a time period; how many files under a folder were added, modified, or deleted; or which user has issued most operations in a time interval.

The system generates backup data of machines that record filesystem's behavior. In addition, the system generates metadata that describes characteristics of the files stored in the filesystem. The metadata is based on a data structure that stores the file attributes such as a file path and hierarchy, a file ownership, an access mode (e.g., read, write, execute permissions), a file type (i.e., a content type), operations performed towards the file and associated timestamps, a machine identifier (ID), a file ID, a file size, and the like. The metadata includes information about file operations that took place during a time interval. The system generates the user interfaces by using the metadata.

Other aspects include components, devices, systems, improvements, methods, processes, applications, computer readable mediums, and other technologies related to any of the above.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
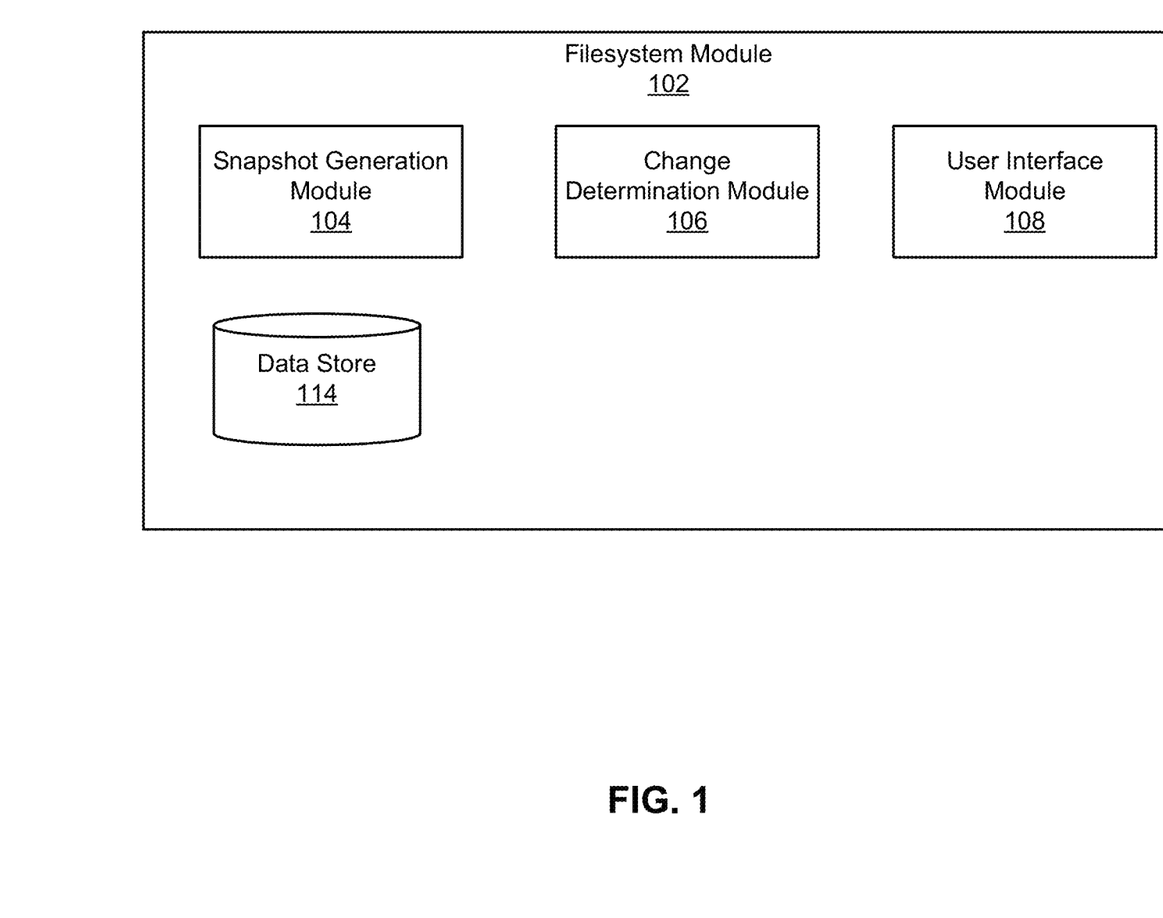
FIG. 1 is a block diagram of an example filesystem module for managing backups of filesystems, according to one embodiment.

FIG. 1 illustrates an example filesystem module 102, according to one embodiment. The filesystem module 102 manages backups of a filesystem. In addition, the filesystem module 102 analyzes and presents changes in a filesystem. The filesystem can reside on a virtual machine or a physical machine. As described herein, a machine can be physical or virtual unless specified. To present changes to files in a filesystem, the filesystem module 102 analyzes operations to filesets in the filesystem during a time interval. The filesystem module 102 presents the changes in the filesystem such that a user can traverse the changes in filesets during a time interval. Compared to conventional systems that present only the entire filesets, systems described herein can present changes in filesystems such that users can ascertain filesystem behaviors over time. Systems provide and maintain data structures based on which changes to individual files of a fileset can tracked.

The filesystem module 102 includes a snapshot generation module 104, a change determination module 106, a user interface module 108, and a data store 104. The snapshot generation module 104 interfaces with another system such as a virtual machine or a physical machine to capture snapshots of filesystems that reside on the machine. A snapshot of a filesystem includes data of a filesystem at the particular time point and is hereinafter also referred to as a "filesystem snapshot." A filesystem snapshot can be used to restore a particular filesystem at a particular time point. A filesystem snapshot can be a full image or an incremental image of the filesystem. The full image captures all data of a filesystem at a particular time point. The incremental image captures data changes of a filesystem over a time interval.

Alternatively, the snapshot generation module 104 interfaces with a data storage device to obtain a filesystem snapshot. In cases where a filesystem includes multiple filesets, a filesystem snapshot includes multiple fileset snapshots that each capture data of a corresponding fileset at the particular time point. A fileset is a subtree of a filesystem that corresponds to a partition of the filesystem. For filesets of a filesystem, the filesystem module 102 can capture fileset snapshots of the filesets at the same time or at different times.

The snapshot generation module 104 further generates metadata associated with the fileset snapshots. The metadata describes characteristics of files included in each fileset for which a fileset snapshot is generated. In various embodiments, the metadata is based on a data structure that stores the file attributes such as a file path and hierarchy, a file ownership, an access mode (e.g., read, write, execute permissions), a file type (i.e., a content type), operations performed towards the file and associated timestamps, a machine identifier (ID), a file ID, a file size, and the like. The file operations can be of different types corresponding to different operations performed towards the files. Example file operations include a read operation, a write operation, a modify operation, an add operation, a move operation, a delete operation, a create operation, a rename operation, and the like.

The metadata can be generated in a variety of ways. In some embodiments, the snapshot generation module 104 crawls the filesystem to obtain the metadata. For example, the snapshot generation module 104 obtains information stored at inodes of a filesystem and stores the obtained information as the metadata. The snapshot generation module 104 may crawl the filesystem periodically to obtain the metadata, for example, concurrently with generating a snapshot or separately from generating the snapshot. In other embodiments, the snapshot generation module 104 mounts and compares two snapshot to obtain information stored in the snapshots that describes the fileset changes. The snapshot comparison includes a list of entries corresponding to fileset changes during a time interval. From the snapshot comparison, the snapshot generation module 104 records the changes in the fileset during the time interval between the two snapshots were captured. The changes in the fileset includes file operations that took place during the time interval and corresponding files.

The change determination module 106 determines changes made to a fileset during a time interval. The change determination module 106 analyzes metadata associated with snapshots that are generated by the snapshot generation module 104 to determine the changes. The fileset metadata includes information about the changes in the fileset during the time interval. This time interval can be the time interval between two snapshots or any time interval specified by a user. Based on the time interval, the change determination module 106 determines changes associated with timestamps that are within the time interval and information associated with the changes. The information can include a file name, a file ID, a file path, a directory, a timestamp, a file operation, a user ID, and the like.

For example, the change determination module 106 determines changes such as files under a particular directory underwent changes during a time interval; how many files underwent a particular type of change during the time interval; information about a file that underwent a particular change such as the file name, a description of the change, a time stamp of the change; and the like. From the changes in the filesystem, the behavior analysis module 106 determines the operations that took place in the filesystem within the time interval.

The user interface module 108 generates user interfaces for presenting the changes determined by the change determination module 106. The user interfaces are configured to allow users to traverse the changes in filesets. As such, users can conveniently discover fileset activities and behavior. As one example, a filesystem user interface is generated for presenting filesystem changes and includes user interface elements that allow users to navigate among different filesets included in the filesystem. The user interface elements can be triggered by users to navigate among different fileset user interfaces for presenting changes in different filesets. A particular user interface element, if triggered, leads a user to a corresponding fileset user interface for presenting fileset changes in a particular fileset. A filset user interface presents fileset changes and includes user interface elements for users to navigate among different directories as well as files under the fileset.

Figure 2:
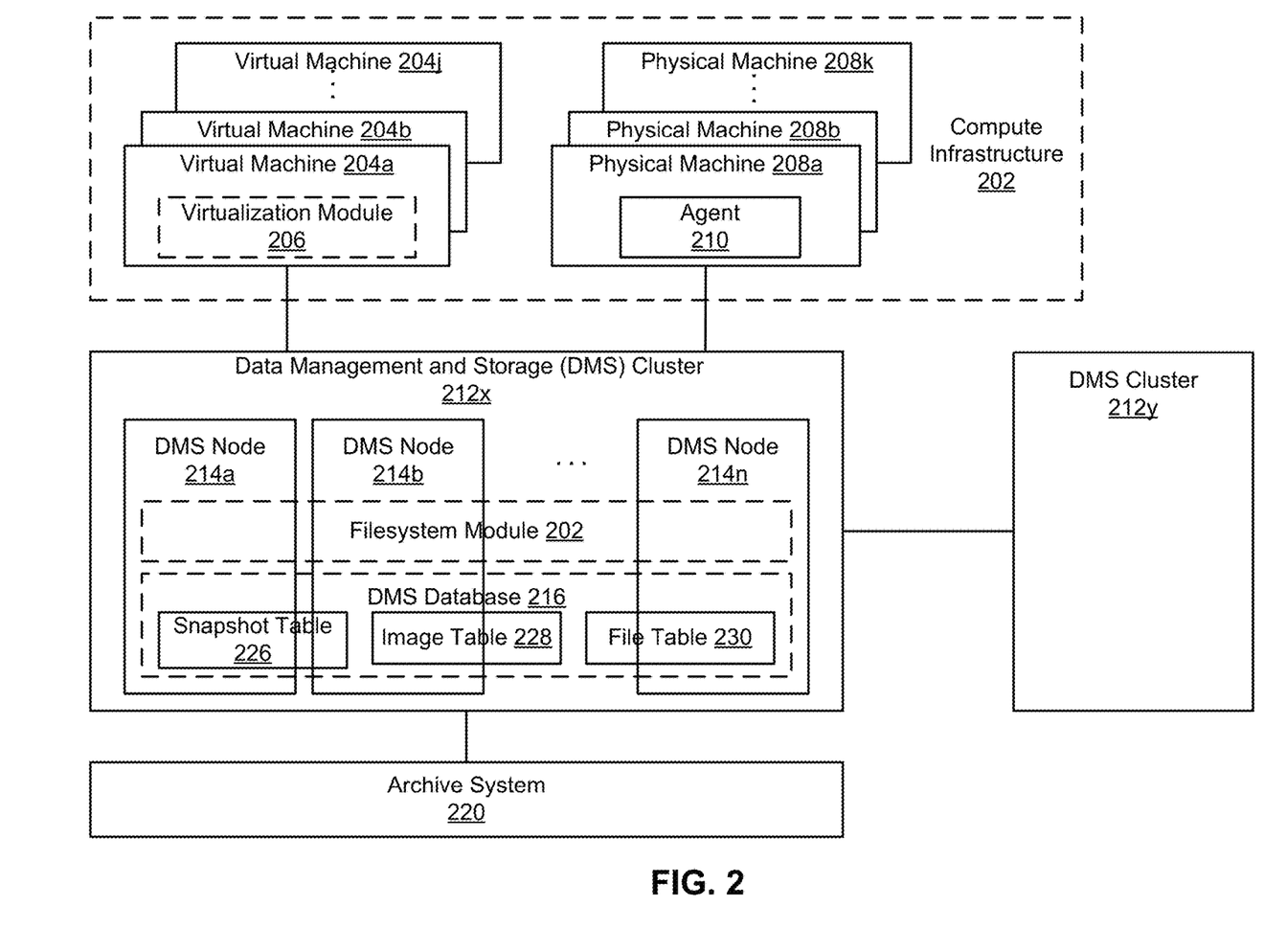
FIG. 2 is a block diagram of a data management and storage (DMS) system, according to one embodiment.

In more detail, FIG. 2 is a block diagram illustrating a system for managing and storing data, according to one embodiment. The system includes a DMS cluster 212*x*, a secondary DMS cluster 212*y* and an archive system 220. The DMS system provides data management and storage services to a compute infrastructure 202, which may be used by an enterprise such as a corporation, university, or government agency. Many different types of compute infrastructures 202 are possible. Some examples include serving web pages, implementing e-commerce services and marketplaces, providing compute resources for an enterprise's internal use, and implementing databases storing user files. The compute infrastructure 202 can include production environments, in addition to development or other environments.

In this example, the compute infrastructure 202 includes both virtual machines (VMs) 204*a-j* and physical machines (PMs) 208*a-k*. The VMs 204 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 208*a-n* can also use different operating systems running various applications. Microsoft Windows running Microsoft SQL or Oracle databases, and Linux running web servers are some examples. The operating systems may also use different filesystem implementations, such as New Technology File System (NTFS), File Allocation Table (FAT), third extended filesystem (ext3), and fourth extended filesystem (ext4).

The DMS cluster 212 manages and stores data for the compute infrastructure 202. This can include the states of machines 204, 208, configuration settings of machines 204, 208, network configuration of machines 204, 208, and data stored on machines 204, 208. Example DMS services includes backup, recovery, replication, archival, and analytics services. The primary DMS cluster 212*x* enables near instant recovery of backup data. Derivative workloads (e.g., testing, development, and analytic workloads) may also use the DMS cluster 212*x* as a primary storage platform to read and/or modify past versions of data.

In this example, to provide redundancy, two DMS clusters 212*x-y* are used. From time to time, data stored on DMS cluster 212*x* is replicated to DMS cluster 212*y*. If DMS cluster 212*x* fails, the DMS cluster 212*y* can be used to provide DMS services to the compute infrastructure 202 with minimal interruption.

Archive system 220 archives data for the computer infrastructure 202. The archive system 220 may be a cloud service. The archive system 220 receives data to be archived from the DMS clusters 212. The archived storage typically is "cold storage," meaning that more time is required to retrieve data stored in archive system 220. In contrast, the DMS clusters 212 provide much faster backup recovery.

The following examples illustrate operation of the DMS cluster 212 for backup and recovery of VMs 204. This is used as an example to facilitate the description. The same principles apply also to PMs 208 and to other DMS services.

Each DMS cluster 212 includes multiple peer DMS nodes 214a-n that operate autonomously to collectively provide the DMS services, including managing and storing data. A DMS node 214 includes a software stack, processor and data storage. DMS nodes 214 can be implemented as physical machines and/or as virtual machines. The DMS nodes 214 are interconnected with each other, for example, via cable, fiber, backplane, and/or network switch. The end user does not interact separately with each DMS node 214, but interacts with the DMS nodes 214a-n collectively as one entity, namely, the DMS cluster 212.

The DMS nodes 214 are peers and preferably each DMS node 214 includes the same functionality. The DMS cluster 212 automatically configures the DMS nodes 214 as new nodes are added or existing nodes are dropped or fail. For example, the DMS cluster 212 automatically discovers new nodes. In this way, the computing power and storage capacity of the DMS cluster 212 is scalable by adding more nodes 214.

The DMS cluster 212 includes the filesystem module 102 and a DMS database 216. The functionality of the filesystem module 102 is distributed across the DMS nodes 214. The DMS database 216 stores data structures used in providing the DMS services, such as definitions of filesystem snapshots and associated metadata or fileset snapshots and associated metadata as described in more detail in connection with FIGS. 3A through 3C. In the following examples, these are shown as tables but other data structures could also be used. Both the DMS database 216 and the data store 114 are distributed across the nodes 214, for example using Apache Cassandra and Atlas. That is, the DMS database 216 in its entirety is not stored at any one DMS node 214. Rather, each DMS node 214 stores a portion of the DMS database 216 but can access the entire DMS database. Data in the DMS database 216 preferably is replicated over multiple DMS nodes 214 to increase the fault tolerance and throughput, to optimize resource allocation, and/or to reduce response time. In one approach, each piece of data is stored on at least three different DMS nodes. The data store 114 has a similar structure, although data in the data store may or may not be stored redundantly. Accordingly, if any DMS node 214 fails, the full DMS database 216 and the full functionality of the DMS cluster 212 will still be available from the remaining DMS nodes. As a result, the DMS services can still be provided.

Considering each of the other components shown in FIG. 2A, a virtual machine (VM) 204 is a software simulation of a computing system. The virtual machines 204 each provide a virtualized infrastructure that allows execution of operating systems as well as software applications such as a database application or a web server. A virtualization module 206 resides on a physical host (i.e., a physical computing system) (not shown), and creates and manages the virtual machines 204. The virtualization module 206 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 206 provides an interface for other computing devices to interface with the virtualized infrastructure. In the following example, the virtualization module 206 is assumed to have the capability to take snapshots of the VMs 204. An agent could also be installed to facilitate DMS services for the virtual machines 204.

In one implementation, the VM 204 can communicate with a DMS node 214 using a distributed file system protocol (e.g., Network File System (NFS) Version 3) via the virtualization module 206. The distributed file system protocol allows the VM 204 to access, read, write, or modify files stored on the DMS node 214 as if the files were locally stored on the physical machine supporting the VM 204. The distributed file system protocol also allows the VM 204 to mount a directory or a portion of a file system located within the DMS node 214.

A physical machine 208 is a physical computing system that allows execution of operating systems as well as software applications such as a database application or a web server. In the following example, an agent 210 is installed on the physical machines 208 to facilitate DMS services for the physical machines.

The snapshot table 226, image table 228, and the file tables 230 are data structures that index the snapshots captured by the DMS cluster 112. In this example, snapshots are decomposed into images, which are stored in the data store 114. The snapshot table 226 describes which images make up each snapshot. For example, a snapshot of a fileset of machine x taken at time y can be constructed from images a,b,c. The image table is an index of images to their location in the data store. For example, image a is stored at location aaa of the data store 114, image b is stored at location bbb, etc. The file table 230 stores fileset metadata information for the data stored in the data store 114. The fileset metadata information describe characteristics of files of a fileset for which a snapshot is generated. Example fileset metadata information includes file names, file sizes, file content types, permissions for files, various times such as when the file was created or last modified. More details of example implementations are provided in FIGS. 3A through 3C below.

Figure 3A:
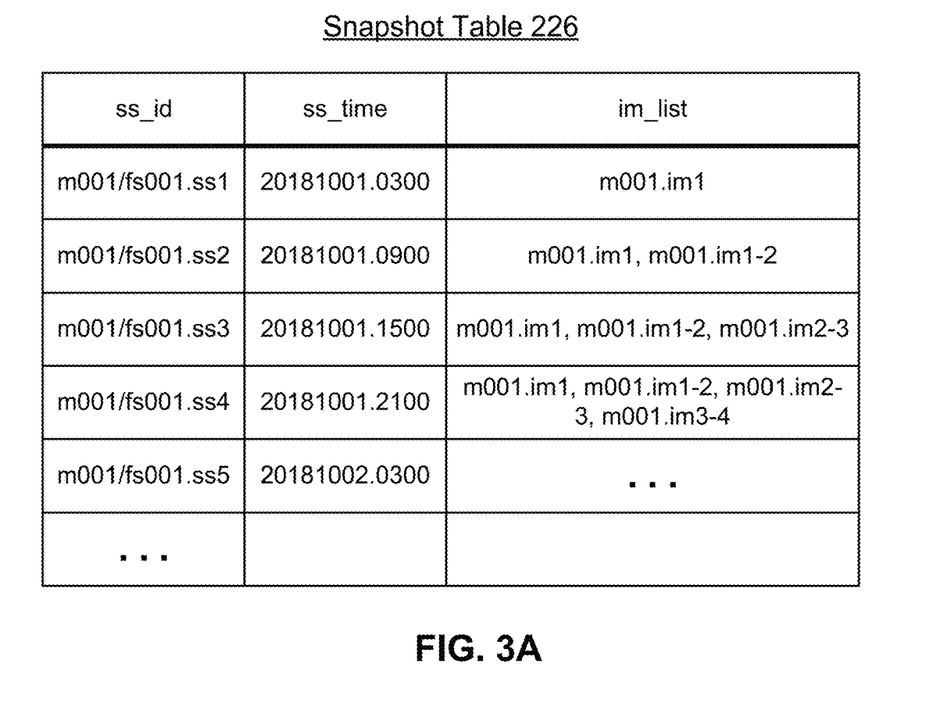
FIGS. 3A-3C are data tables that illustrate managing backups of filesystems, according to one embodiment.
Figure 3B:
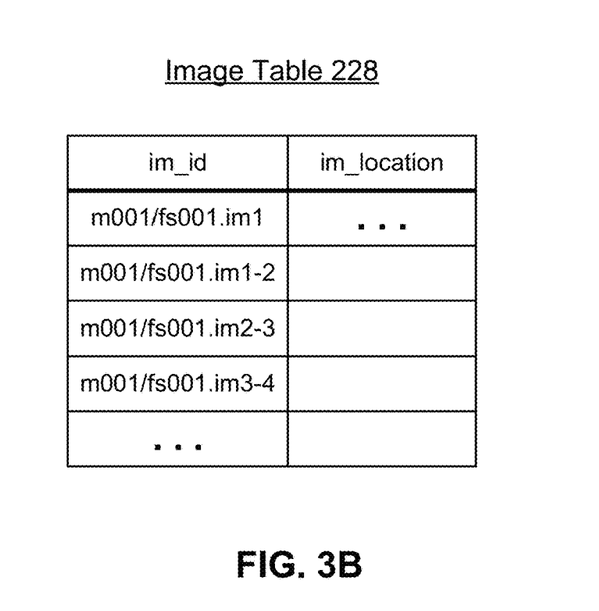
Figure 3C:
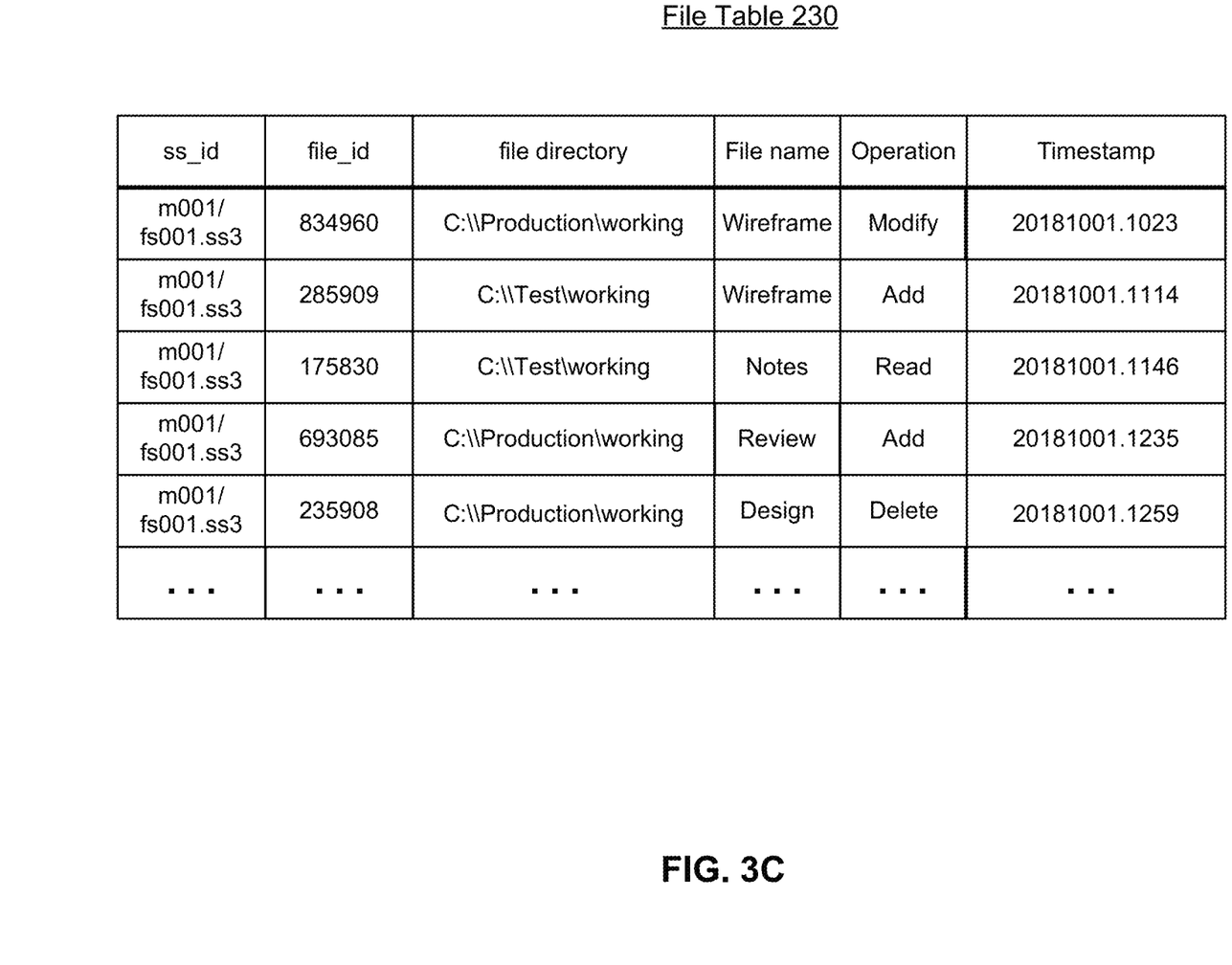

FIGS. 3A through 3C are examples of a snapshot table 226, an image table 228, and a file table 230, respectively, illustrating a series of backups for a machine m001. Each row of the snapshot table is a different snapshot, each row of the image table is a different image, and each row of the file table is a different file. The snapshot is whatever is being backed up at that point in time. In the nomenclature of FIGS. 3A-3C, m001/fs001.ss1 is a snapshot of fileset 001 of machine m001 taken at time t1. In the suffix ".ss1", the .ss indicates this is a snapshot and the 1 indicates the time t1. m001/fs001.ss2 is a snapshot of fileset 001 of machine m001 taken at time t2, and so on. Images are what is saved in the data store 118. For example, the snapshot m001/fs001.ss2 taken at time t2 may not be saved as a full backup. Rather, it may be composed of a full backup of snapshot m001/fs001.ss1 taken at time t1 plus the incremental difference between the snapshots at times t1 and t2. The full backup of snapshot m001/fs001.ss1 is denoted as m001/fs001.im1, where ".im" indicates this is an image and "1" indicates this is a full image of the snapshot at time t1. The incremental difference is m001/fs001.im1-2 where "1-2" indicates this is an incremental image of the difference between snapshot m001/fs001.ss1 and snapshot m001/fs001.ss2.

In this example, the backups occur at 3 am, 9 am, 3 pm and 9 pm of each day. The first backup occurs on Oct. 1, 2018 at 3 am (time t1) and creates the top rows in the snapshot table 226 and image table 228. In the snapshot table 226, the ss_id is the snapshot ID which is m001/fs001.ss1. The ss_time is a timestamp of the snapshot, which is Oct. 1, 2018 at 3 am. im_list is the list of images used to compose the snapshot. Because this is the first snapshot taken, a full image of the snapshot is saved (m001/fs001.im1). The image table 228 shows where this image is saved in the data store 228.

On Oct. 1, 2018 at 9 am (time t2), a second backup of machine m001 is made. This results in the second row of the snapshot table for snapshot m001/fs001.ss2. The image list of this snapshot is m001/fs001.im1 and m001/fs001.im1-2. That is, the snapshot m001/fs001.ss2 is composed of the base full image m001/fs001.im1 combined with the incremental image m001/fs001.im1-2. The new incremental image m001/fs001.im1-2 is stored in data store 114, with a corresponding entry in the image table 228. This process is performed for the fileset and continues every 6 hours as additional snapshots are made.

The file table 230 stores metadata associated with fileset snapshots. Each entry of the file table 230 corresponds to a particular file of the fileset. Each entry is identified by a fileset snapshot ID and a file ID. Because the fileset snapshot m001/fs001.ss3 is an incremental snapshot, the file table 230 stores metadata associated with files that have changed since Oct. 1, 2018 at 9 am when the previous filesnapshot was created. For example, at 10:23 am, the file 834960 was modified. This file is stored under the file directory "C:\\Production\\working." As another example, at 12:35 pm, the file 693085 was added and this file is stored under the file directory "C:\\Production\\working." The file table may further include other types of information such as a user ID identifying a user who performing the operation, a file size, a file size change, and the like.

A machine is identified by machine_user_id, which is the ID of the machine in the compute infrastructure. It points to the location of the machine in the user space, so that DMS cluster can find the machine in the compute infrastructure. It is also identified by machine_id, which is a unique ID used internally by the DM cluster. In this example, there is a mix of virtual machines (VMxx) and physical machines (PMxx).

For virtual machines, pulling a snapshot for the VM typically includes the following steps: freezing the VM and taking a snapshot of the VM, transferring the snapshot (or the incremental differences) and releasing the VM. For example, the DMS cluster 212 may receive a virtual disk file that includes the snapshot of the VM. The backup process may also include deduplication, compression/decompression and/or encryption/decryption.

The functionality of the filesystem module 202 is distributed across the nodes 214. For example, each DMS nodes includes software stacks that include a job scheduler, a job engine, and a user interface; and the DMS database 216 includes other data structures such as a job queue (not shown) in addition to the snapshot table 226, image table 228, and file table 230.

The job schedulers create jobs to be processed by the job engines. These jobs are posted to the job queue. Example jobs include analyze filesystem behavior during a time interval, pull snapshots (take a snapshot of a fileset), mount snapshots, generate fileset metadata, replicate (to the secondary DMS cluster), and archive, etc. The jobs can be determined according to the service schedule or the DMS cluster's operation separate from the service schedule.

The user interface allows users to interact with the DMS cluster 212. Preferably, each of the DMS nodes includes a user interface, and any of the user interfaces can be used to access the DMS cluster 212. This way, if one DMS node fails, any of the other nodes can still provide a user interface. The user interface can be used to define what services should be performed at what time for which machines in the compute infrastructure (e.g., the frequency of backup for each machine in the compute infrastructure). The user interface can also be used to allow the user to run filesystem behavior analysis or other diagnostics (reports or analytics) and to review analysis results.

The software stack also includes other interfaces such as an interface to the computer infrastructure 202, through which the DMS nodes 212 may make requests to the virtualization module 206 and/or the agent 210. In one implementation, the VM 204 can communicate with a DMS node 214 using a distributed file system protocol (e.g., Network File System (NFS) Version 3) via the virtualization module 206. The distributed file system protocol allows the VM 204 to access, read, write, or modify files stored on the DMS node 214 as if the files were locally stored on the physical machine supporting the VM 204. The distributed file system protocol also allows the VM 204 to mount a directory or a portion of a file system located within the DMS node 214. There are also interfaces to the DMS database 216 and the data store 114, as well as network interfaces such as to the secondary DMS cluster 212y and to the archive system 220.

A physical machine 208 is a physical computing system that allows execution of operating systems as well as software applications such as a database application or a web server. In the following example, an agent 210 is installed on the physical machines 208 to facilitate DMS services for the physical machines.

The components shown in FIG. 2 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 2 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 4:
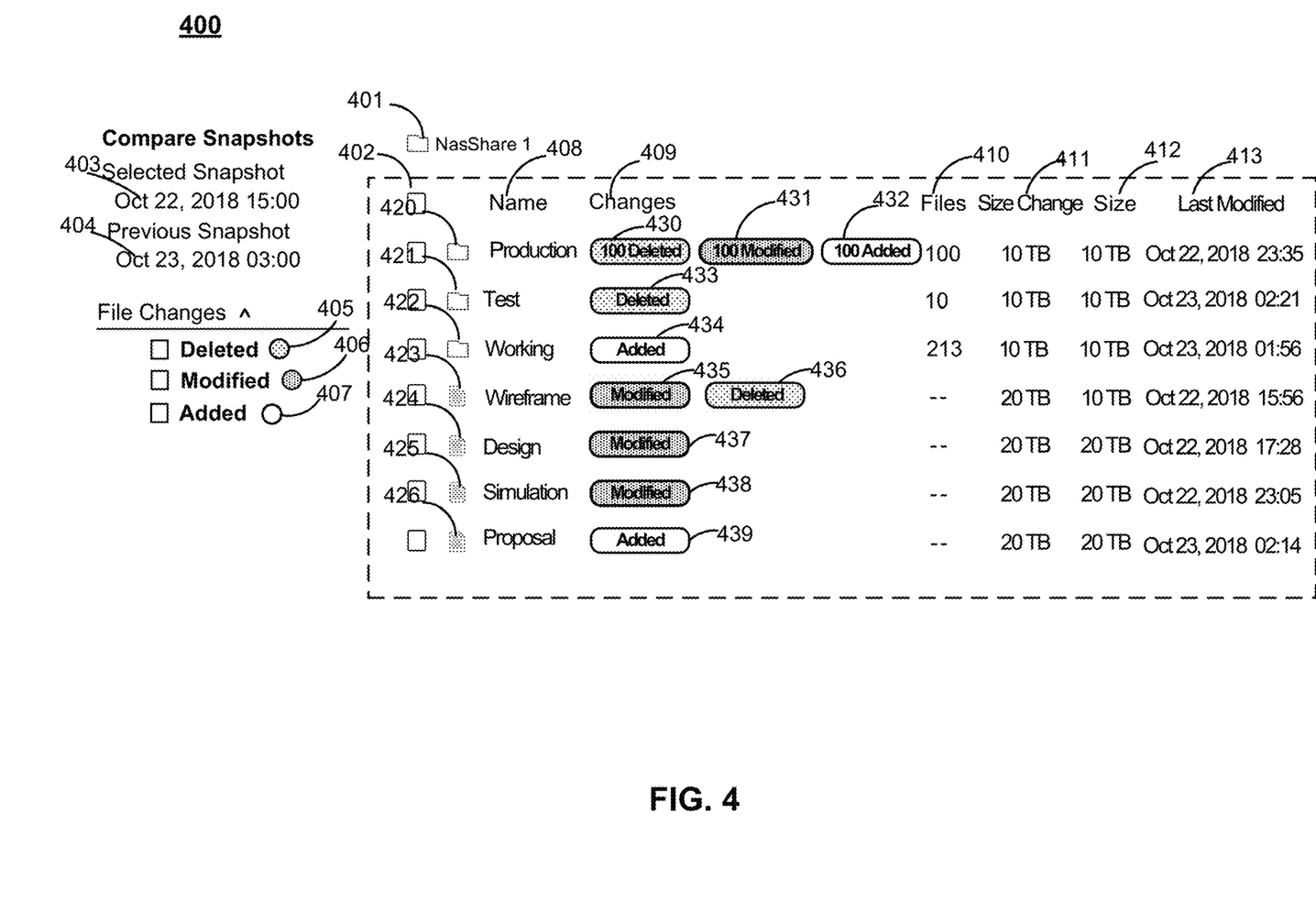
FIG. 4 illustrates an example user interface, according to one embodiment.

FIG. 4 illustrates an example user interface 400, according to one embodiment. The user interface 400 presents changes in a file system. The user interface element 401 identifies the folder of the filesystem for which the changes are presented. The user interface element 402 presents behavior information of the folder that is identified. The user interface elements 403, 404 present information about snapshots of the filesystem that are references for determining the changes in the filesystem. In the illustrated example, the user interface elements 403, 404 present the timestamps associated with the snapshots. The time interval during which the changes are presented by the user interface 400 is presented to users. The user interface elements 405, 406, 407 present different types of changes in the filesystem. The user interface elements 405, 406, 407 are visually distinguished from each other and each present a unique change in the filesystem. In the illustrated example, the user interface elements 405, 406, 407 are configured in different shadings. Other configurations such as different colors or shapes are possible. The user interface elements 405, 406, 407 can be selected or deselected to show or hide the corresponding changes.

The user interface element 420 is organized such that each column identifies information that is presented and each row presents the identified information related to a folder or a file. The user interface elements 408 through 413 display a description of the information that is presented. In the illustrated example, the user interface 402 is configured to present information such as a name of a folder or a file, a summary of the changes, a number of files under a folder, a size change, a size, and a timestamp of the last change. A user can configure the user interface 400 to present other types of information such as a path of a folder or a path of a file, a summary of the historical behavior of the folder or file such as an average number of changes (addition, modification, deletion) over a time period, a historical average number of changes (addition, modification, deletion), and the like.

Take the first row for example, the user interface element 420 identifies the folder "Production". The user elements 430, 431, 432 together present information related to the changes in the folder: the user element 430 presents that there are 100 deletions, the user element 431 presents that there are 100 modifications, and the user element 432 presents that there are 100 additions. Take fourth row as another example, the user interface element 423 identifies the file "wireframe." The user elements 435, 436 present change information related to the particular file: modification and deletion.

Figure 5:
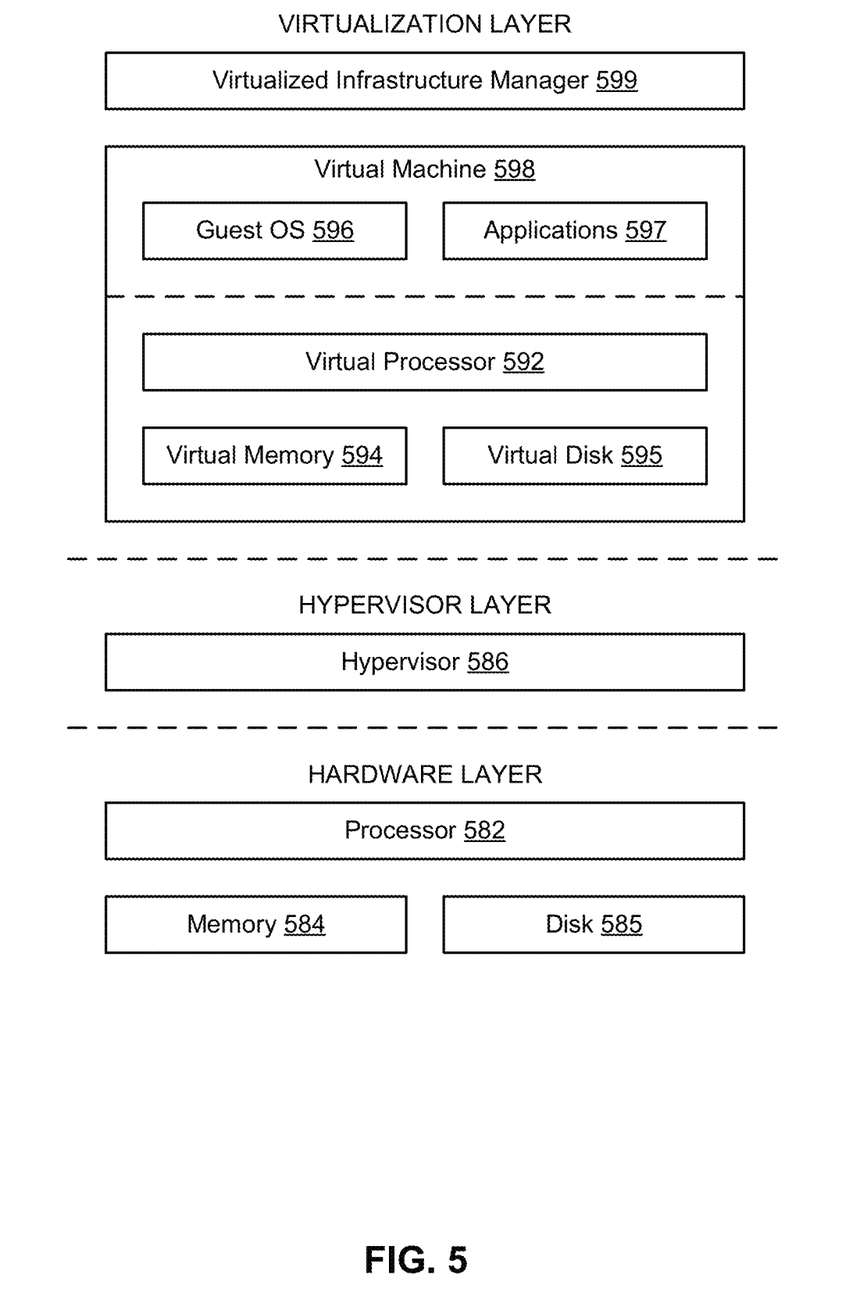
FIG. 5 is a block diagram of a virtual machine, according to one embodiment.
Figure 6:
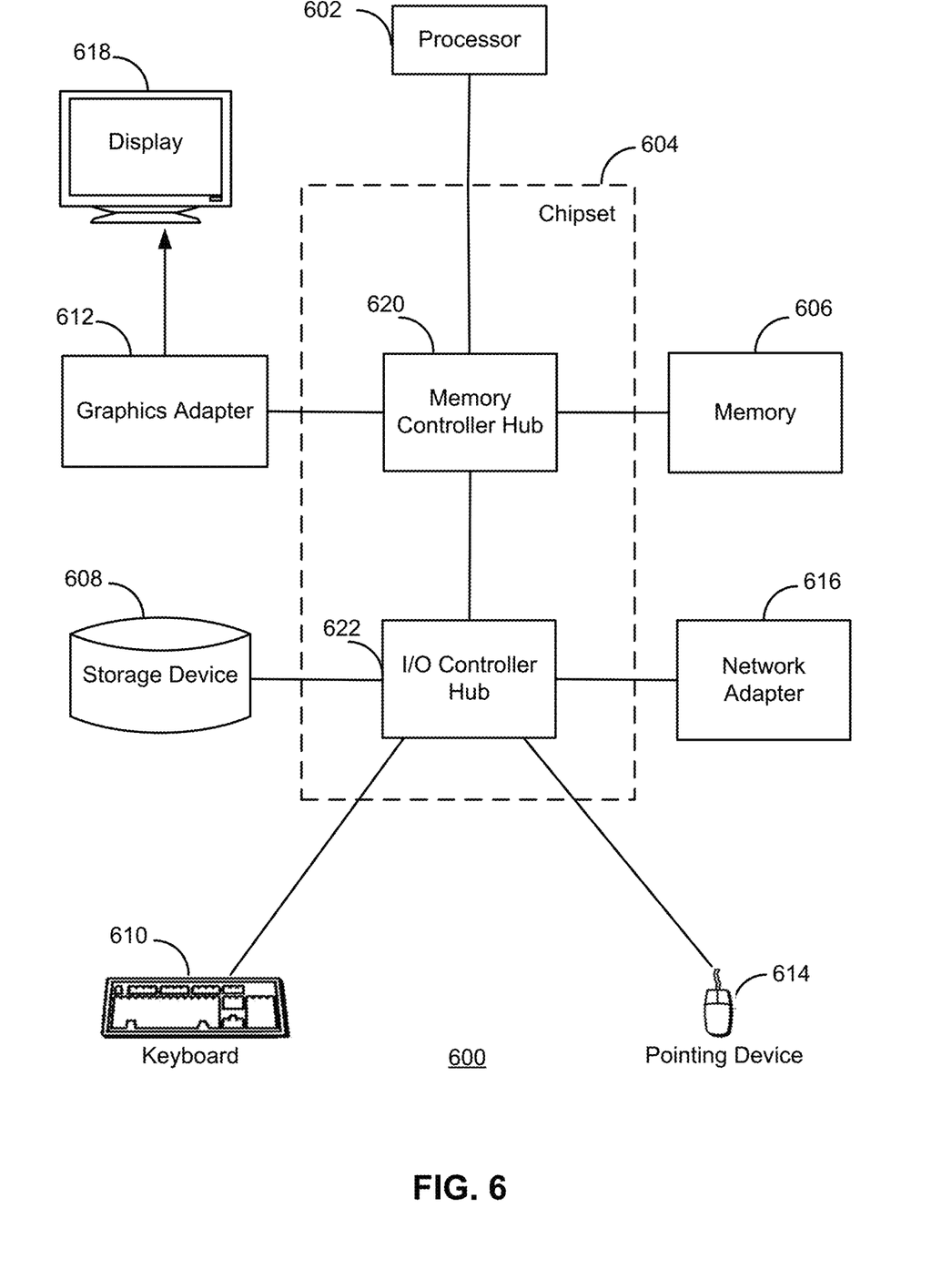
FIG. 6 is a block diagram of a computer system suitable for use in a DMS system, according to one embodiment.

FIG. 5 is a block diagram of a server for a VM platform, according to one embodiment. The server includes hardware-level components and software-level components. The hardware-level components include one or more processors 582, one or more memory 584, and one or more storage devices 585. The software-level components include a hypervisor 586, a virtualized infrastructure manager 599, and one or more virtual machines 598. The hypervisor 586 may be a native hypervisor or a hosted hypervisor. The hypervisor 586 may provide a virtual operating platform for running one or more virtual machines 598. Virtual machine 598 includes a virtual processor 592, a virtual memory 594, and a virtual disk 595. The virtual disk 595 may comprise a file stored within the physical disks 585. In one example, a virtual machine may include multiple virtual disks, with each virtual disk associated with a different file stored on the physical disks 585. Virtual machine 598 may include a guest operating system 596 that runs one or more applications, such as application 597. Different virtual machines may run different operating systems. The virtual machine 598 may load and execute an operating system 596 and applications 597 from the virtual memory 594. The operating system 596 and applications 597 used by the virtual machine 598 may be stored using the virtual disk 595. The virtual machine 598 may be stored as a set of files including (a) a virtual disk file for storing the contents of a virtual disk and (b) a virtual machine configuration file for storing configuration settings for the virtual machine. The configuration settings may include the number of virtual processors 592 (e.g., four virtual CPUs), the size of a virtual memory 594, and the size of a virtual disk 595 (e.g., a 10 GB virtual disk) for the virtual machine 595.

The virtualized infrastructure manager 599 may run on a virtual machine or natively on the server. The virtualized infrastructure manager 599 corresponds to the virtualization module 106 above and may provide a centralized platform for managing a virtualized infrastructure that includes a plurality of virtual machines. The virtualized infrastructure manager 599 may manage the provisioning of virtual machines running within the virtualized infrastructure and provide an interface to computing devices interacting with the virtualized infrastructure. The virtualized infrastructure manager 599 may perform various virtualized infrastructure related tasks, such as cloning virtual machines, creating new virtual machines, monitoring the state of virtual machines, and facilitating backups of virtual machines.

FIG. 5 is a high-level block diagram illustrating an example of a computer system 500 for use as one or more of the components shown above, according to one embodiment. Illustrated are at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display device 518 is coupled to the graphics adapter 512. A storage device 508, keyboard 510, pointing device 514, and network adapter 516 are coupled to the I/O controller hub 522. Other embodiments of the computer 500 have different architectures. For example, the memory 506 is directly coupled to the processor 502 in some embodiments.

The storage device 508 includes one or more non-transitory computer-readable storage media such as a hard drive, compact disk read-only memory (CD-ROM), DVD, or a solid-state memory device. The memory 506 holds instructions and data used by the processor 502. The pointing device 514 is used in combination with the keyboard 510 to input data into the computer system 500. The graphics adapter 512 displays images and other information on the display device 518. In some embodiments, the display device 518 includes a touch screen capability for receiving user input and selections. The network adapter 516 couples the computer system 500 to a network. Some embodiments of the computer 500 have different and/or other components than those shown in FIG. 5. For example, the virtual machine 304, the physical machine 308, and/or the DMS node 314 in FIG. 3 can be formed of multiple blade servers and lack a display device, keyboard, and other components.

The computer 500 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. In a data management and storage (DMS) cluster including a plurality of peer DMS nodes and a distributed data store implemented across the peer DMS nodes, a method of managing data backups of filesets of a compute infrastructure serviced by the DMS cluster, the method comprising:

generating fileset metadata associated with a snapshot, the fileset metadata describing attributes of files included in a fileset, the fileset metadata based on an attribute data structure which includes at least one of a machine identifier and an access mode, the snapshot capturing a state of the fileset;

determining one or more changes to one or more files of the fileset during a time interval based at least on the fileset metadata, the determination further including identification, based on the attribute data structure, of at least one of a machine identifier and an access mode associated with a respective machine or user to which the one or more changes is attributable;

generating one or more user interfaces configured to present one or more changes and configured to receive instructions from a user to implement a behavior analysis of the one or more changes of the fileset, the one or more user interfaces including one or more user interface elements configured to traverse a filesystem; and providing the one or more user interfaces for display on a user device.

2. The method of claim 1, wherein generating the one or more user interfaces comprises determining one or more file paths associated with one or more files and generating the one or more user interface elements based on the one or more file paths, and wherein a user interface element is configured to present a corresponding file path.

3. The method of claim 1, wherein the one or more changes include one or more file operations within the time interval.

4. The method of claim 3, wherein the one or more file operations include at least one of a create operation, a delete operation, and a modify operation.

5. The method of claim 4, wherein generating the one or more user interfaces comprises determining file operations performed towards the one or more files and generating the one or more user interface elements based on the file operations, and wherein a user interface element is configured to present a corresponding file operation.

6. The method of claim 1, wherein the fileset includes one or more folders, further comprising:
for a folder of the one or more folders:
determining a set of files under the folder based at least on the fileset metadata; and
identifying a set of changes to the set of files, and wherein generating the one or more user interfaces comprises generating a user interface element configured to present the set of changes.

7. The method of claim 6, further comprising categorizing the set of changes into one or more groups and wherein generating the one or more user interfaces comprises generating one or more user interface elements each configured to present a corresponding group of changes.

8. The method of claim 7, further comprising determining a quantity of changes included in each group and wherein one of the one or more user interface elements is configured to present the quantity of changes.

9. The method of claim 1, further comprising determining the one or more files undergoing changes during the time interval.

10. The method of claim 1, further comprising pulling, by a peer DMS node of the peer DMS nodes, the snapshot of the fileset.

11. The method of claim 10, wherein the snapshot is an incremental image of the fileset capturing changes to the fileset over the time interval.

12. The method of claim 1, generating a fileset containing metadata associated with the snapshot comprises:
retrieving the snapshot;
mounting the snapshot; and
crawling the snapshot to obtain the metadata.

13. A system of managing data backups of filesets of a compute infrastructure serviced by a data management and storage (DMS) cluster including a plurality of peer DMS nodes and a distributed data store implemented across the peer DMS nodes, comprising:
a processor for executing computer program instructions; and
a non-transitory computer-readable storage medium storing computer program instructions executable by the processor, the computer program instructions configured to cause the processor to perform:
generating fileset metadata associated with a snapshot, the fileset metadata describing attributes of files included in a fileset, the fileset metadata based on attribute data structure which includes at least one of a machine identifier and an access mode, the snapshot capturing a state of the fileset;
determining one or more changes to one or more files of the fileset during a time interval based at least on the fileset metadata, the determination further including identification, based on the attribute data structure, of at least one of a machine identifier and an access mode associated with a respective machine or user to which the one or more changes is attributable;
generating one or more user interfaces configured to present one or more changes and configured to receive instructions from a user to implement a behavior analysis of the one or more changes of the fileset, the one or more user interfaces including one or more user interface elements configured to traverse a filesystem; and
providing the one or more user interfaces for display on a user device.

14. The system of claim 13, wherein the computer program instructions for generating the one or more user interfaces are configured to cause the processor to perform determining one or more file paths associated with one or more files and generating the one or more user interface elements based on the one or more file paths, and wherein a user interface element is configured to present a corresponding file path.

15. The system of claim 13, wherein the one or more changes include one or more file operations within the time interval, and wherein the one or more file operations include at least one of a create operation, a delete operation, and a modify operation.

16. The system of claim 15, wherein the computer program instructions for generating the one or more user interfaces are configured to cause the processor to perform determining file operations performed towards the one or more files and generating the one or more user interface elements based on the file operations, and wherein a user interface element is configured to present a corresponding file operation.

17. The system of claim 13, wherein the fileset includes one or more folders and wherein the computer program instructions are configured to cause the processor to further perform:
for a folder of the one or more folders:
determining a set of files under the folder based at least on the fileset metadata; and
identifying a set of changes to the set of files, and and wherein the computer program instructions for generating the one or more user interfaces are configured to cause the processor to perform generating a user interface element configured to present the set of changes.

18. The system of claim 17, wherein the computer program instructions are configured to cause the processor to further perform categorizing the set of changes into one or more groups and wherein the computer program instructions for generating the one or more user interfaces are configured to cause the processor to perform generating one or more user interface elements each configured to present a corresponding group of changes.

19. The system of claim 18, wherein the computer program instructions are configured to cause the processor to further perform determining a quantity of changes included in each group and wherein one of the one or more user interface elements is configured to present the quantity of changes.

20. The system of claim 13, wherein the computer program instructions are configured to cause the processor to further perform pulling, by a peer DMS node of the peer DMS nodes, the snapshot of the fileset.

* * * * *

UNITED STATES PATENT AND TRADEMARK OFFICE
CERTIFICATE OF CORRECTION

PATENT NO. : 11,016,855 B2
APPLICATION NO. : 16/240678
DATED : May 25, 2021
INVENTOR(S) : Adduri et al.

It is certified that error appears in the above-identified patent and that said Letters Patent is hereby corrected as shown below:

In the Specification

In Column 2, Line 45, delete "104." and insert --114.-- therefor

In Column 4, Line 32, delete "208$a$-$n$" and insert --208$a$-$k$-- therefor

In Column 6, Line 18, delete "112." and insert --212.-- therefor

In Column 6, Line 46, delete "118." and insert --114.-- therefor

In Column 9, Line 59, delete "106" and insert --206-- therefor

In Column 10, Line 3, delete "FIG. 5" and insert --FIG. 6-- therefor

In Column 10, Line 4, delete "500" and insert --600-- therefor

In Column 10, Line 6, delete "502" and insert --602-- therefor

In Column 10, Line 7, delete "504." and insert --604.-- therefor

In Column 10, Line 7, delete "504" and insert --604-- therefor

In Column 10, Line 8, delete "520" and insert --620-- therefor

In Column 10, Line 8, delete "522." and insert --622.-- therefor

In Column 10, Line 9, delete "506" and insert --606-- therefor

In Column 10, Line 9, delete "512" and insert --612-- therefor

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,016,855 B2

In Column 10, Line 10, delete "520," and insert --620,-- therefor

In Column 10, Line 10, delete "518" and insert --618-- therefor

In Column 10, Line 11, delete "512." and insert --612.-- therefor

In Column 10, Line 11, delete "508," and insert --608,-- therefor

In Column 10, Line 12, delete "510," and insert --610,-- therefor

In Column 10, Line 12, delete "514," and insert --614,-- therefor

In Column 10, Line 12, delete "516" and insert --616-- therefor

In Column 10, Line 13, delete "522." and insert --622.-- therefor

In Column 10, Line 14, delete "500" and insert --600-- therefor

In Column 10, Line 15, delete "506" and insert --606-- therefor

In Column 10, Line 16, delete "502" and insert --602-- therefor

In Column 10, Line 17, delete "508" and insert --608-- therefor

In Column 10, Line 20, delete "506" and insert --606-- therefor

In Column 10, Line 21, delete "502." and insert --602.-- therefor

In Column 10, Line 22, delete "514" and insert --614-- therefor

In Column 10, Line 22, delete "510" and insert --610-- therefor

In Column 10, Line 23, delete "500." and insert --600.-- therefor

In Column 10, Line 24, delete "512" and insert --612-- therefor

In Column 10, Line 25, delete "518." and insert --618.-- therefor

In Column 10, Line 26, delete "518" and insert --618-- therefor

In Column 10, Line 27, delete "516" and insert --616-- therefor

In Column 10, Line 28, delete "500" and insert --600-- therefor

In Column 10, Line 29, delete "500" and insert --600-- therefor

CERTIFICATE OF CORRECTION (continued)
U.S. Pat. No. 11,016,855 B2

In Column 10, Line 30, delete "FIG. 5." and insert --FIG. 6.-- therefor

In Column 10, Line 31, delete "304," and insert --204,-- therefor

In Column 10, Line 31, delete "308," and insert --208,-- therefor

In Column 10, Line 32, delete "314" and insert --214-- therefor

In Column 10, Line 34, delete "500" and insert --600-- therefor

In Column 10, Line 41, delete "508," and insert --608,-- therefor

In Column 10, Line 42, delete "506," and insert --606,-- therefor

In Column 10, Line 42, delete "502." and insert --602.-- therefor